United States Patent
Salle

(10) Patent No.: US 9,480,150 B2
(45) Date of Patent: *Oct. 25, 2016

(54) STACKABLE SECURITY WRAPS

(71) Applicant: Johnson Electric S.A., Murten (CH)

(72) Inventor: Vincent Daniel Jean Salle, Cowes (GB)

(73) Assignee: JOHNSON ELECTRIC S.A., Murten (CH)

( * ) Notice: Subject to any disclaimer, the term of this patent is extended or adjusted under 35 U.S.C. 154(b) by 205 days.

This patent is subject to a terminal disclaimer.

(21) Appl. No.: 13/971,094

(22) Filed: Aug. 20, 2013

(65) Prior Publication Data

US 2014/0049887 A1 Feb. 20, 2014

(30) Foreign Application Priority Data

Aug. 20, 2012 (GB) .................................. 1214823.5

(51) Int. Cl.
*H05K 7/00* (2006.01)
*H05K 1/02* (2006.01)
*G06F 21/86* (2013.01)
(Continued)

(52) U.S. Cl.
CPC ............ *H05K 1/0275* (2013.01); *G06F 21/86* (2013.01); *G06F 21/70* (2013.01); *G06F 21/71* (2013.01); *H01H 2239/032* (2013.01); *H05K 2201/0999* (2013.01); *H05K 2201/09263* (2013.01); *Y10S 206/807* (2013.01); *Y10S 428/915* (2013.01); *Y10S 428/916* (2013.01)

(58) Field of Classification Search
CPC ........ G06F 21/86; G06F 21/71; G06F 21/70; H05K 1/0275; H05K 5/0208; H05K 1/0386; H05K 2201/047; G08B 13/12; G08B 21/185; Y10S 206/807; Y10S 428/915; Y10S 428/916; Y10S 257/922; H01H 2239/032
USPC ........ 361/748, 752, 759, 760, 761; 713/194; 340/541

See application file for complete search history.

(56) References Cited

U.S. PATENT DOCUMENTS 4,336,529 A * 6/1982 Buan ............................. 705/405
4,691,350 A * 9/1987 Kleijne et al. ................. 713/194

(Continued)

FOREIGN PATENT DOCUMENTS

EP         1 742 184 A1    1/2007
EP         1742184 A1 *    1/2007   ............. G08B 13/12

(Continued)

OTHER PUBLICATIONS

Search Report issued by the Intellectual Property Office of GB in corresponding Application No. 1214823.5 on Dec. 19, 2012.

*Primary Examiner* — James Wu
(74) *Attorney, Agent, or Firm* — Muncy, Geissler, Olds & Lowe, P.C.

(57) ABSTRACT

A security assembly for protecting a device including first and second security wraps fitted to the device. The first security wrap covers a first area of the device. The second security wrap partially overlaps the first security wrap and covers a second area of the device. Each of the first and second security wraps has a security screen having a pair of screen terminals and a conductive track extending between the screen terminals A conductive structure is disposed in an overlapping area between the first and second security Wraps and coupled to the first screen terminals of the first security screen and to the second screen terminals of the second security screen.

7 Claims, 5 Drawing Sheets

(51) Int. Cl.
*G06F 21/71* (2013.01)
*G06F 21/70* (2013.01)

(56) References Cited

U.S. PATENT DOCUMENTS

2003/0025617 A1* 2/2003 Kunigkeit et al. ............... 341/22
2005/0161253 A1* 7/2005 Heitmann et al. ............ 174/261
2006/0259788 A1 11/2006 Elbert et al.
2007/0271544 A1* 11/2007 Engstrom ....................... 716/15

2008/0278353 A1 11/2008 Smith et al.
2010/0102127 A1* 4/2010 Bonnet et al. ................ 235/439
2014/0033331 A1* 1/2014 Salle et al. ...................... 726/34

FOREIGN PATENT DOCUMENTS

| GB | 2 182 176 A | 5/1987 | | |
|----|----|----|----|----|
| GB | 2 258 075 A | 1/1993 | | |
| JP | 2002049317 A | * | 2/2002 | ............... G09F 3/03 |
| WO | WO 2008/002878 A2 | 1/2008 | | |

* cited by examiner

STACKABLE SECURITY WRAPS

CROSS REFERENCE TO RELATED APPLICATIONS

This non-provisional patent application claims priority under 35 U.S.C. §119(a) from Patent Application No. 1214823.5 filed in United Kingdom on Aug. 20, 2012.

FIELD OF THE INVENTION

This invention relates to a tamper indication device and in particular to a stackable security wrap for an electronic circuit to protect against tampering.

Although this invention will be described in relation to security wraps for a printed circuit board as an example of the invention, the invention can be used with any printed electronics (PE) flex having a need for protection against or detection of tampering.

BACKGROUND OF THE INVENTION

Traditional security wraps form a solid security screen masking an area of the electronics to be protected. Removal of the security wrap is physically difficult due to the manner in which the security wrap is attached to the device, usually by gluing, soldering or encapsulation by a resin material. Modern security wraps have a security screen electrically connecting a pair of terminals of an alarm circuit. The security screen may be damaged or broken during attempts to tamper with the device to thereby set off an alarm condition. The alarm circuit may disable the device or simply give a visual indication that the security wrap has been tampered with.

In a co-pending commonly assigned patent application, there is disclosed a security wrap of the breakable conductor type, having a security screen with a conductor that is relatively thin and densely packed over the area to be protected to prevent tampering and arranged or designed to easily fracture should an attempt be made to tamper with the security wrap once fitted. However, security wraps are often required to cover complex shapes which may be best protected by using two or more security wraps. With only a limited number of alarm terminals available, connection of the security screens of multiple security wraps may be problematic.

Hence, there is a desire for a security wrap which can be stacked with another security wrap with the security screens of the two security wraps being electrically interconnected.

SUMMARY OF THE INVENTION

Accordingly, in one aspect thereof, the present invention provides a security assembly for protecting a device, comprising first and second security wraps fitted to the device. The first security wrap covers a first area of the device, and has a first security screen comprising a pair of first screen terminals and a conductive track extending between said first screen terminals. The second security wrap partially overlaps said first security wrap, covers a second area of the device, and has a second security screen comprising a pair of second screen terminals and a conductive track extending from said second screen terminals. A conductive structure is disposed in an overlapping area between said first security wrap and said second security wrap and coupled to said screen terminals of said first security screen and to said screen terminals of said second security screen.

Preferably, said first screen terminals of said first security screen and said second screen terminals of said second security screen are coupled to two corresponding terminals of an alarm circuit of the device.

Preferably, said first security wrap further includes a first substrate; said first security screen includes said first screen terminals and said conductive track formed on said first substrate; and said conductive structure includes a conductive plug formed in said first substrate and coupled to said first screen terminals of said first security screen and to said second screen terminals of said second security screen.

Optionally, said conductive structure includes a conductive resilient disc disposed between said first security wrap and said second security wrap, said conductive resilient disc being in contact with said first screen terminals of said first security screen and with said second screen terminals of said second security screen in response to a compression in the overlapping area between said first security wrap and said second security wrap.

Optionally, an adhesive layer in the overlapping area between said first security wrap and said second security wrap, said adhesive layer compressing said conductive resilient disc in contact with said first screen terminals of said first security screen and with said second screen terminals of said second security screen.

Optionally, further comprising a spigot over the overlapping area between said first security wrap and said second security wrap, said spigot compressing said conductive resilient disc in contact with said first screen terminals of said first security screen and with said second screen terminals of said second security screen.

Optionally, said conductive structure includes a carbon pad disposed in the overlapping area between said first security wrap and said second security wrap and in contact with said second screen terminals of said second security screen; said carbon pad and said first screen terminals of said first security screen define a gap there between; and said carbon pad is in contact with said first screen terminals of said first security screen in response to a compression of the overlapping area between said first security wrap and said second security wrap.

Preferably, said conductive structure includes a printed conductive through hole electrically connected to said first screen terminals of said first security screen and said second screen terminals of said second security screen.

Preferably, said second security wrap includes a folded wrap.

Preferably, said first and second security screens include first and second breakable conductive tracks formed on said first and second security wraps, respectively.

According to a second aspect thereof, the present invention provides a security assembly for protecting a device includes first and second wrap. The first wrap comprises a substrate having first side and second sides opposite to each other, a first conductive track bonded to the first side of said substrate and having two ends forming first screen terminals coupled to the device and second screen terminals, and a first adhesive layer covering said first conductive track over the first side of said substrate and bonding said substrate to the device. The second wrap has an overlapping area with said first wrap and comprises a substrate having first and second sides opposite to each other, a second conductive track bonded to the first side of said substrate and having two ends forming second screen terminals coupled to the first screen terminals of said first conductive track and second screen terminals coupled to the device, and a second adhesive layer covering said second conductive track over the first side of said substrate and bonding the substrate to the device. A conductive structure is disposed in the overlapping area between said first wrap and said second wrap and in said substrate of said first wrap, said conductive structure being coupled to said first screen terminals of said first conductive track and to said second screen terminals of said second conductive track.

Preferably, said first and second conductive tracks includes first and second breakable conductive tracks.

Preferably, further comprising an intermittent pattern of release ink disposed between the first side of said substrate of said first wrap and said first conductive track to selectively modify a bonding strength between said first conductive track and said substrate of said first wrap.

Preferably, said first screen terminals of said first conductive track are coupled to third terminals of the alarm circuit of the device; said second screen terminals of said second conductive track coupled to third terminals of the alarm circuit of the device; said first conductive track and said second conductive track form a series conductive path between the first and second terminals of the device.

Preferably, said first wrap is fitted to the device and covers a first area of the device; and said second wrap is fitted to the device and covers a second area of the device.

By overlaying and interconnecting security wraps, complex areas can be covered or protected by the security wraps without having to form large complex security wraps which have high material wastage.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
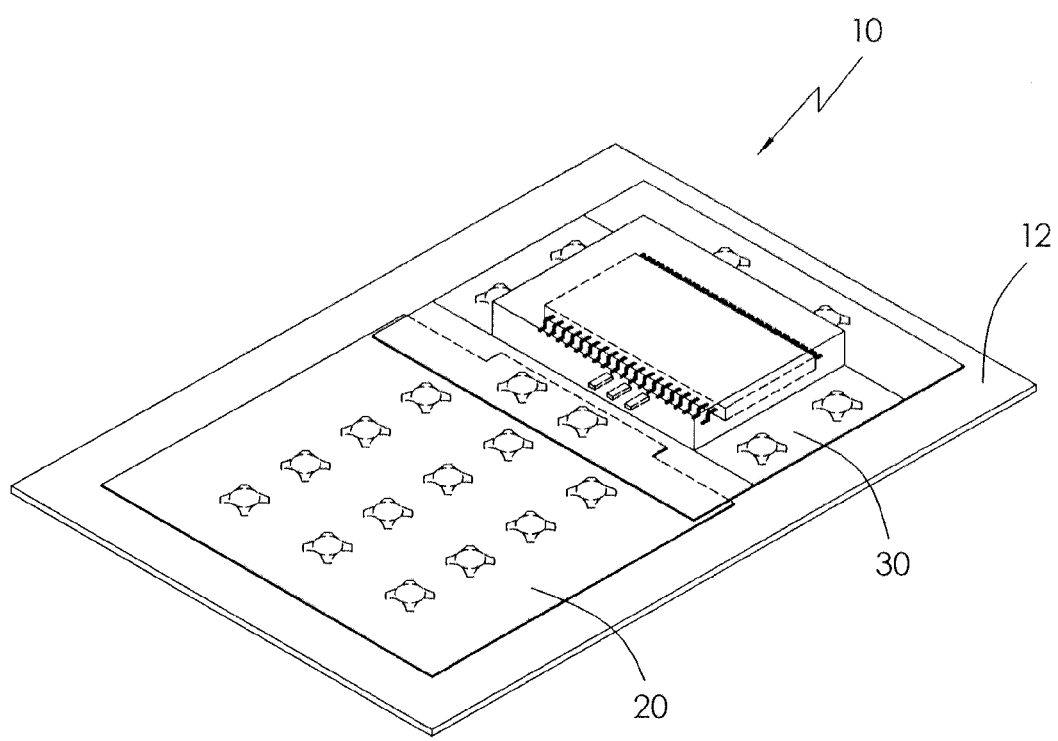
FIG. 1 illustrates an exemplary PCB, protected by two interconnected security wraps.
Figure 2:
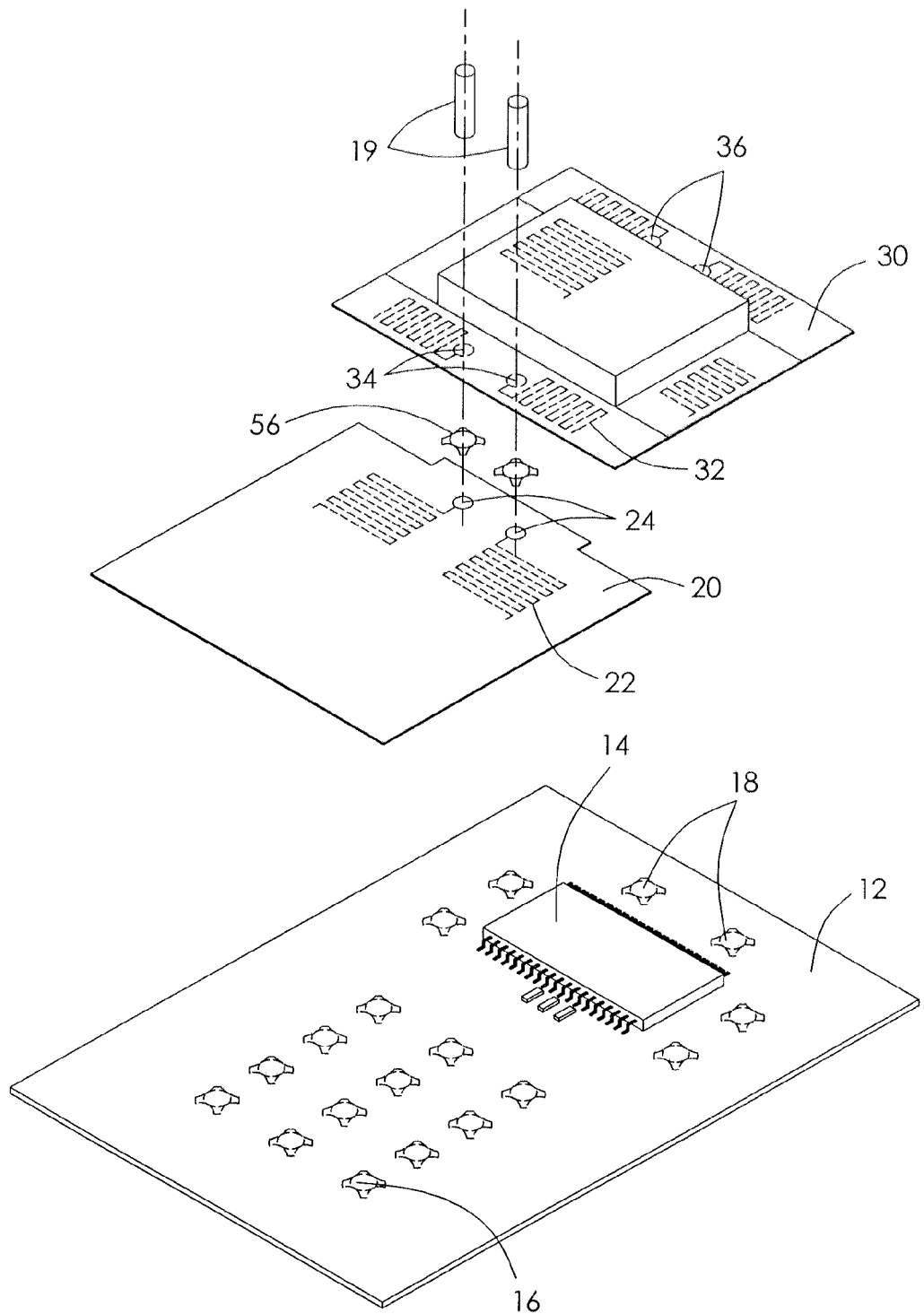
FIG. 2 is an exploded view of the device of FIG. 1.
Figure 3:
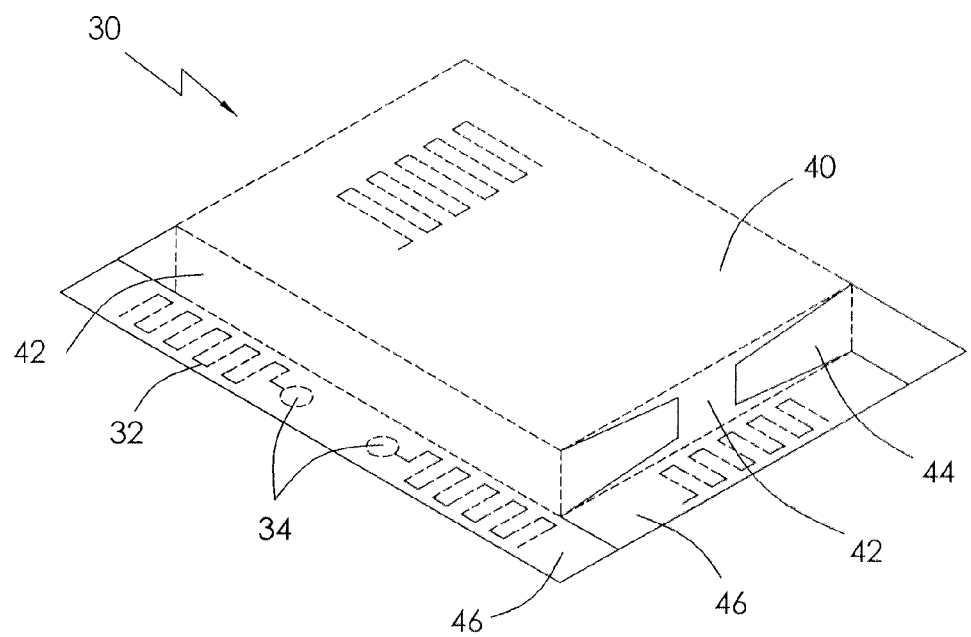
FIG. 3 illustrates a folded security wrap, being one of the security wraps shown in FIG. 1.

FIGS. 1 and 2 illustrate an electronic device 10, by way of example only, in the form of a printed circuit board (PCB) 12 having electronic components such as a CPU 14 that is desired to be protected against tampering. The PCB 12 also has a key pad having a number of keys represented as circles 16 on the lower section of the PCB 12, for entering data and instructions for the CPU 14. Two security wraps 20, 30 are fitted to the PCB 12. A first security wrap 20 covers the key pad portion of the PCB 12. It may also cover smaller electronic components. A second security wrap 30 covers the CPU 14 and larger electronic components. To accommodate the CPU 14, which is too large to be securely covered by a flat security wrap, the second security wrap 30 is of the folded type wherein the wrap 30 is folded to form a chamber for the CPU 14. Alternatively, the second security wrap 30 may be an embossed security wrap having a preformed chamber to accommodate the CPU 14. Preferably the second security wrap 30 is mounted to the first security wrap 20 as this allows a more simple assembly and construction of the first security wrap 20. Each security wrap 20, 30 has a conductive circuit 22, 32 between a pair of screen terminals 24, 34 forming a security screen. The screens, in use, form a conductive path between terminals 18 of an alarm circuit. When the electrical connection between the alarm terminals 18 is interrupted, such as when the conductor of a screen is broken or the security wrap is removed, an alarm condition is triggered. The response to the alarm condition depends on the device but may include shutting down of the device, resetting the memory of the CPU, disabling or total destruction of the device.

The PCB 12 and the two security wraps 20, 30 are shown in exploded view in FIG. 2. As can be seen, two conductive spring discs 56, known as domes, are used to electrically connect the security screens of the security wraps 20, 30 together. It is preferable for the security screens to be connected in series so that to the alarm circuit, the two security screens appear and function as a single security screen. A pair of third terminals 36 is shown formed on the second wrap 30. The third terminals 36 are arranged to connect to the alarm terminals 18 and form the ends of the conductive path formed by the screens. As will be realized, for the third terminals 36 to be the ends of the conductive path, the second wrap 30 must have two security screens, one screen extending between one of the third terminals 36 to one of the second terminals 34 and the other screen extending between the other third terminal 36 and the other second terminal 34. Alternatively the third terminals 36 could be formed on the first wrap 20. This depends on the layout and location of the terminals of the alarm circuit and the layout of the wraps. It is also possible for each wrap to have one third terminal and one first or second terminal such that each wrap has only one conductive screen. This has the advantage of requiring only one through connection to be formed in the first substrate.

Figure 4:
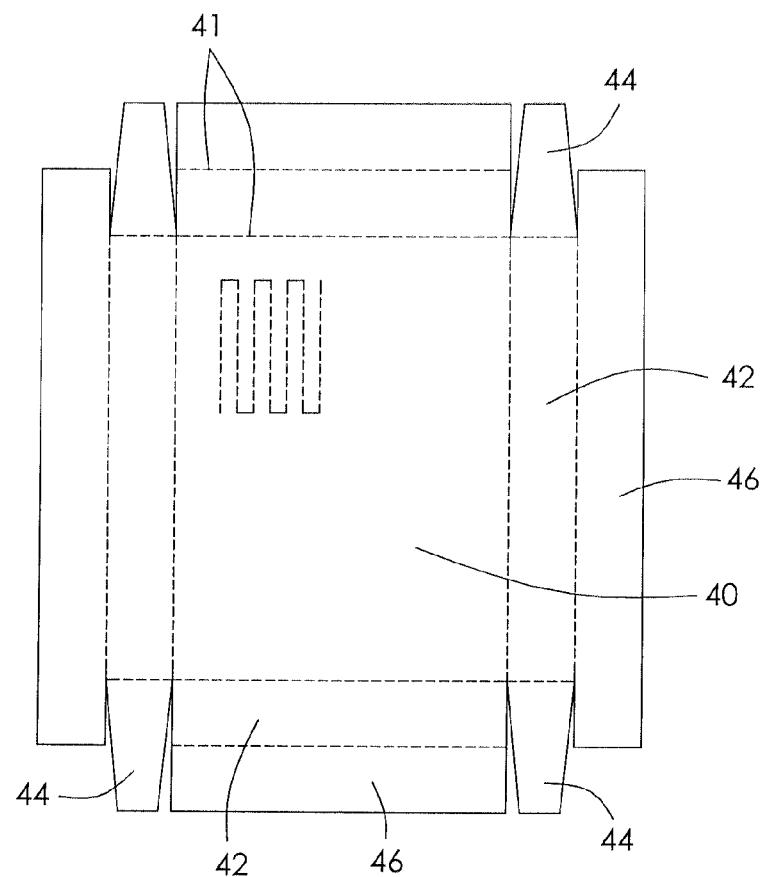
FIG. 4 illustrates the security wrap of FIG. 3 before it is folded into its final form.

As mentioned, the second security wrap 30 is preferably formed as a folded wrap. This means that the wrap 30 is formed from a flat sheet of flexible substrate material. Once the flat wrap has been formed and cut to shape, it is folded into the desired shape. The unfolded or developed state is shown in FIG. 4. Fold lines are indicated by dashed lines 41. The security screen 32 is also partially indicated by a dashed line. In practice, the security screen 32 covers substantially the entire under surface of the substrate which is then covered with an adhesion to fix the wrap 30 to the device. As can be seen, the pre-folded wrap has a central portion 40, four side portions 42 extending from the central portion 40 across fold lines. Panels 46 extend from each side portion 42 across a fold line. The two longer side portions 42 also have two flaps 44 extending from the short edges. When folded, the flaps 44 lay over the adjacent shorter side portion 42 and are fixed thereto by adhesive. Panels 46 are turned out to form a rim that is arranged to be fixed to the PCB 12, with one panel slightly raised to sit on the first security wrap 20 and thus is fixed to the PCB 12 via the first security wrap 20 whereas the other panels, in the embodiment shown, are fixed directly to the PCB 12.

The general principles of construction of a security wrap will now be described with reference to the first security wrap 20 and FIG. 6. The security wrap has a substrate 50, a conductive circuit 22, and a layer of adhesive 54 to bond the security wrap to the parent device, i.e., to PCB 12. An insulating layer, such as a dielectric layer, may be used to provide insulation between the conductive circuit 22 and the adhesive or device. The adhesive, if non-conductive, may function as the insulating layer.

For a security wrap 20 with breakable conductors, an intermittent layer of adhesive modifier or release layer 52 is applied between the substrate 50 and the first conductive circuit 22. It should be noted that the use of breakable conductors is optional and that breakable conductors can be formed using a different method not involving a release layer.

The substrate 50 is preferably a polymer film, typically a polyethylene terephthalate (PET or commonly referred to as polyester) film, that provides a base for a security wrap circuit. Optionally the substrate is flexible, being a film of thickness between 25 µm and 175 µm but can be greater depending on functional requirements and may include other variants of polymer film including, but not limited to, polycarbonate, PEN, polyimide and PVC. The substrate 50 may be clear but preferably is opaque and pigmented, for example black or white, to hide the configuration of the conductive screen 22 and the underlying circuitry on PCB 12.

The release layer 52 is preferably, a ultra-violet (UV), infra-red (IR) or thermally cured ink system used to provide a different adhesion level between the substrate 50 and the security screen 22. The ink is thus an adhesion modifier. The release layer 52 is intermittent and applied to the substrate 50 in a predetermined pattern by a printing process and is not a complete layer such that there are areas of substrate which are not covered by the adhesion modifier ink. Optionally, the pattern of the release layer 52 is simple stripes or dots.

The conductive circuit 22 is composed of a pattern formed by a conductive trace or conductor preferably formed by thermoset or thermoplastic conductive ink printed over the substrate 50 in variable trace widths and serpentine mesh patterns forming an electrically conductive path between a pair of screen terminals 24. Preferably, the screen terminals 24 are simply the ends of the conductors.

The conductive inks can be silver, silver-coated copper or gold containing conductive or resistive ink, each with specific properties that suit the necessary requirement for the operation and functionality of the security wrap flexible circuit. The conductive ink can also be carbon, graphite, clear conductive polymer or other conductive or resistive ink, each with specific properties that suit the necessary requirement for the operation and functionality of the security wrap.

A dielectric layer such as a UV curable ink system with electrically insulative properties may be used to electrically insulate the security screen 22 to avoid short circuits, if needed.

The adhesive layer 54 is preferably a pressure-sensitive adhesive (PSA), typically an acrylic adhesive that forms a bond between surfaces when pressure is applied. The adhesive may be applied as an adhesive ink or as a laminate. The adhesive layer is used to bond the security wrap to the parent device. Alternatively, the adhesive maybe a liquid adhesive such as an epoxy, or moisture-cure urethane etc. which is dispensed or printed between the security wrap and the PCB, which is then cured by moisture, thermal or UV energy and forms a permanent bond between wrap and PCB. This type of adhesive is not pressure sensitive, but could work under the same disclosed principle.

Depending on the material of the parent device 10 to which the security wrap 20 is adhered a variant PSA with specific adhesion properties could be used. Specifically the adhesion to the parent device 10 must be stronger than the adhesion to the substrate 50, so that on removal of the security wrap 20 from the parent device 10, the adhesive layer 54 will remain adhered to the parent device 10 in order to break the conductor of the conductive circuit 22.

First wrap 20 differs from the second wrap 30 in that normally the screen terminals are on the same side of the substrate 50 as the screen and the adhesive so that the security wrap protects the connections to the alarm terminals. However, as the screen of the first wrap 20 needs to be connected to the screen of the second wrap 30, the first screen terminals 24 extend through the first substrate 50 as shown in FIG. 6. This is preferably achieved by a printed or filled through hole, although a plated through hole could be used. A printed through hole is formed by making a suitable hole in the substrate 50 and filling it with conductive ink, typically at the time of forming the conductors of the screen, thus providing a conductive path through the substrate 50. Such holes are known as a via. The connection is protected by the second wrap 30.

The screen terminal 34 of the second wrap 30 is formed as a projection of the end of the conductor 32 forming the second screen and preferably forms a projection extending into the adhesive layer 54. The actual connection between the first and second screens 20, 30 may take different forms.

Figure 6:
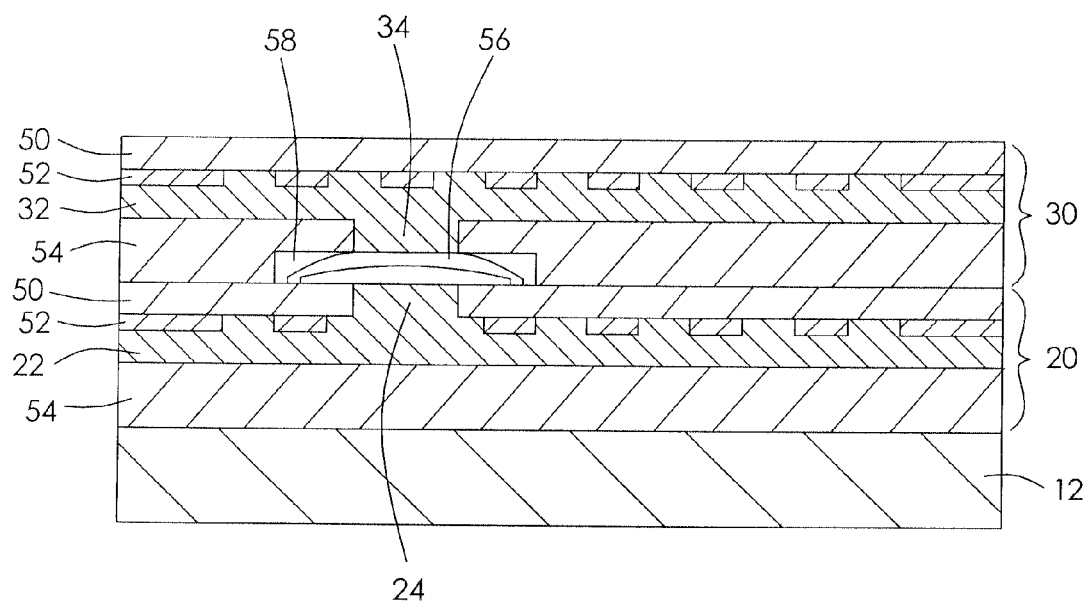
FIG. 6 is an enlarged view of a connection shown in FIG. 5.

FIG. 6 illustrates the preferred method using conductive domes 56. The dome 56 is inserted into a recess 58 in the adhesive layer 54 aligned with the corresponding second screen terminal 34 such that the dome 56 is in electrical contact with the second screen terminal 34 of the second wrap 30 and is aligned with the corresponding first screen terminal 24 of the first wrap 20. The dome 56 can be arranged in two ways. Firstly as a resilient contact whereby the adhesive provides a mild compression force on the dome 56 so that the resilience of the dome 56 allows the connection to tolerate slight movement as may occur for example by rough handling or thermal expansion of the various components. Alternatively, the dome 56 acts a spring loaded lift off contact requiring an external force to be applied to the connection in order to compress the dome to establish an electrical connection between the screen terminals. The dome 56 is shown in the relaxed state in FIG. 6.

Figure 5:
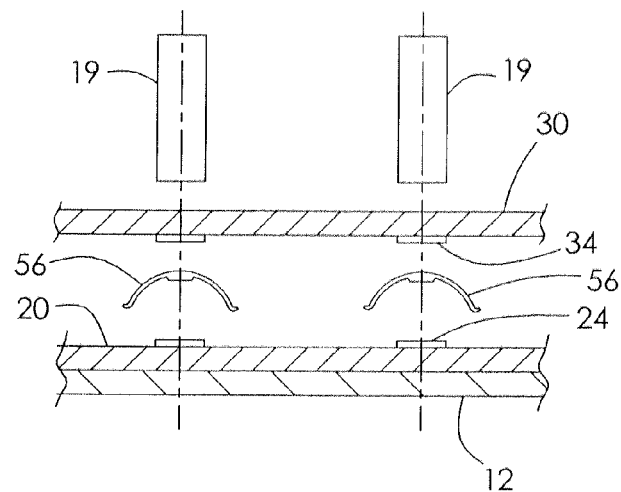
FIG. 5 is a sectional schematic of the electrical connection between the two security wraps.

FIG. 5 is an exploded schematic illustrating a preferred method of applying force to the connections. The dome 56, in the relaxed state, lifts of the screen terminal 24 breaking electrical contact there with. Spigots 19 formed on a part of the housing for the PCB 12 are arranged to bear down on the second security wrap 30 so as to press the second screen terminals 34 against the domes 56 and the domes 54 against the first screen terminals 24 to establish an electrical connection between the screens as the housing is closed. When the housing is opened, the spigots 19 separate from the security wrap 30 and the dome 56 relaxes breaking the connection and raising an alarm condition. In this way, an alarm condition is triggered by merely opening the housing before any direct attempt to remove the security wrap 30 is made.

Figure 7:
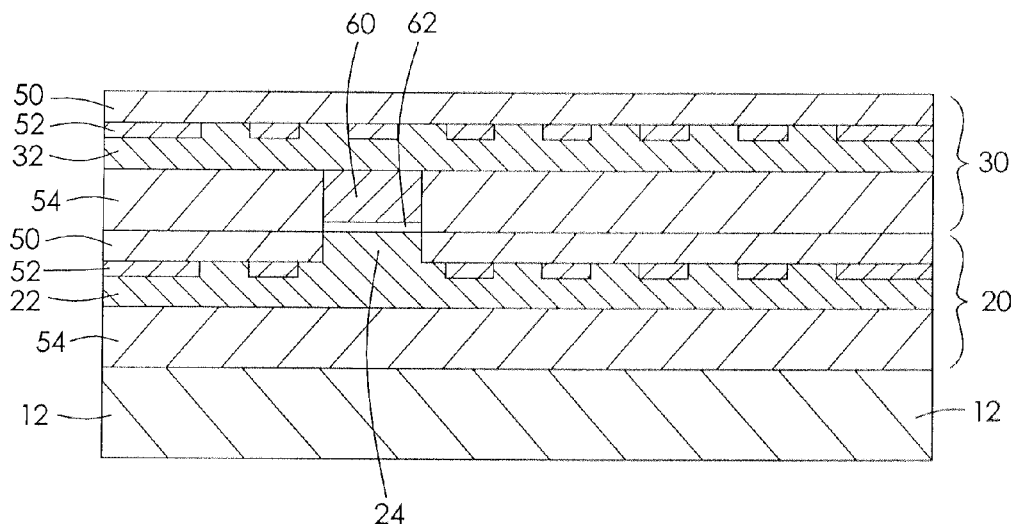
FIGS. 7 & 8 illustrate alternative connection methods.

FIG. 7 is an enlarged sectional view, similar to FIG. 6, of a different method of connecting the screens. The dome is replaced by a carbon pad 60 which is slightly thinner than the adhesive layer 54 so that the carbon pad 60 faces the first screen terminal 24 across a small air gap 62. The carbon pad 60 makes direct contact with the second screen terminal 34 and may actually form the second screen terminal 34. When an external force is applied to the second wrap 30 in the region of the carbon pad 60, the second substrate 50 is resiliently deformed and the carbon pad 60 is pressed against the corresponding first screen terminal 24, establishing an electrical connection between the screens. On removal of the external force, the substrate 50 relaxes and the carbon pad 60 separates from the first screen terminal 24 to break the connection thus raising an alarm condition.

Figure 8:
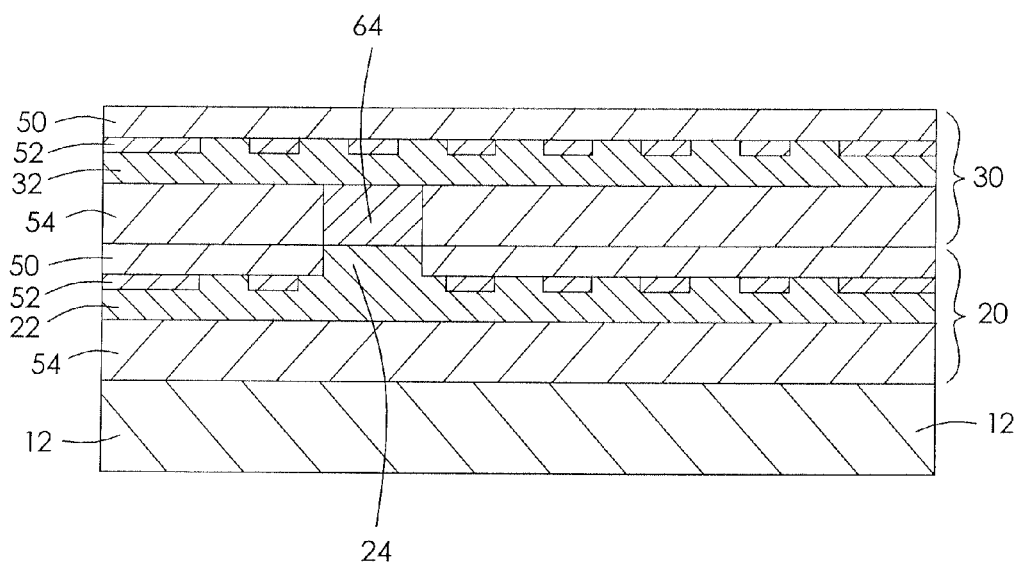

FIG. 8 illustrates another connection method wherein a plug 64 of conductive material replaces the carbon pad 60 shown in FIG. 7. The plug 64 completely extends across the thickness of the adhesive layer 54 to make direct contact between the first and second screen terminals 24, 34. The plug 64 may be of any suitable material such as conductive foam but preferably it is formed of conductive ink, formed at the time of printing the conductors of the second screen. The plug 64 maybe directly connected to the first screen terminal 24 by pressure from the adhesive layer, or by conductive adhesive, conductive paste, etc.

While the preferred embodiment uses security wraps with breakable conductors the present invention is also applicable to more traditional security wraps where the conductors of the security screen as not specifically designed to be broken if the security wrap is removed from the device. Depending on the complexity of the alarm circuit, a security screen may have any number of conductors.

While the drawings have been enlarged for better clarity of observation and description, in the preferred embodiments, the width of the conductive traces and the spaces there between are in the range of 1 to 1,000 microns. The preferred embodiment uses a trace width between 200 and 300 microns. This produces a good compromise between costs and security level as the finer the widths the higher the security level but the printing process is more expensive.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A security assembly for protecting a device, comprising:
   a first security wrap fitted to the device, covering a first area of the device, and having a first security screen comprising a pair of first screen terminals and a conductive track having opposite ends connected to said first screen terminals;
   a second security wrap fitted to the device, partially overlapping said first security wrap, covering a second area of the device, and having a second security screen comprising a pair of second screen terminals and a pair of conductive tracks each extending from one of said second screen terminals; and
   a conductive structure disposed in an overlapping area between said first security wrap and said second security wrap and electrically coupled to said first screen terminals of said first security screen and to said second screen terminals of said second security screen;
   wherein a printed conductive through hole forming said first screen terminals of said first security screen;
   wherein said first screen terminals of said first security screen and said second screen terminals of said second security screen are coupled through said pair of conductive tracks and through two corresponding third terminals to an alarm circuit of the device;
   wherein said conductive structure includes a conductive resilient disc disposed between said first security wrap and said second security wrap, said conductive resilient disc being in contact with said first screen terminals of said first security screen and with said second screen terminals of said second security screen in response to a compression in the overlapping area between said first security wrap and said second security wrap;
   an adhesive layer in the overlapping area between said first security wrap and said second security wrap, wherein the conductive resilient disc is disposed in a recess inside the adhesive layer, said adhesive layer compressing said conductive resilient disc in contact with said first screen terminals of said first security screen and with said second screen terminals of said second security screen; and
   a spigot over the overlapping area between said first security wrap and said second security wrap, said spigot compressing said conductive resilient disc in contact with said first screen terminals of said first security screen and with said second screen terminals of said second security screen.

2. The security assembly of claim 1, wherein said second security wrap includes a folded wrap.

3. The security assembly of claim 1, wherein said first and second security screens include first and second breakable conductive circuits formed on said first and second security wraps, respectively.

4. A security assembly for protecting a device, comprising:
   a first wrap comprising:
   a substrate having first side and second sides opposite to each other;
   a first conductive track bonded to the first side of said substrate and having two opposite ends forming first screen terminals coupled to a second screen terminal; and
   a first adhesive layer covering said first conductive track over the first side of said substrate and bonding said substrate to the device;
   a second wrap having an overlapping area with said first wrap and comprising:
   a substrate having first and second sides opposite to each other;
   a pair of second conductive tracks bonded to the first side of said substrate each and having one end forming the second screen terminal coupled to the first screen terminals of said first conductive track; and
   a second adhesive layer covering said second conductive track over the first side of said substrate and bonding the substrate to the device; and
   a conductive structure disposed in the overlapping area between said first wrap and said second wrap and in said substrate of said first wrap, said conductive structure being electrically coupled to said first screen terminals of said first conductive track and to said second screen terminals of said second conductive track;
   wherein:
   a printed conductive through hole forming said first screen terminals of said first conductive track;
   said first screen terminals of said first conductive track are coupled through third terminals to an alarm circuit of the device;

said second screen terminals of said second conductive track are coupled through third terminals to the alarm circuit of the device;

said first and second terminals being connected to said third terminals through said pair of second conductive tracks;

said first conductive track and said pair of second conductive tracks form a series conductive path between the third terminals;

wherein said conductive structure includes a conductive resilient disc disposed in the overlapping area, said conductive resilient disc being in contact with said first screen terminals of said first conductive track and with said second screen terminals of said second conductive track in response to a compression in the overlapping area between said first wrap and said second wrap;

wherein the first and second adhesive layers in the overlapping area between said first wrap and said second wrap and compressing said conductive resilient disc in contact with said first screen terminal of said first conductive track and with said second screen terminal of said second conductive track, wherein the conductive resilient disc is disposed in a recess inside the second adhesive layer; and a spigot over the overlapping area between said first wrap and said second wrap, said spigot compressing said conductive resilient disc in contact with said first screen terminals of said first conductive track and with said second screen terminals of said second conductive track.

5. The security assembly of claim 4, wherein said first and second conductive tracks includes first and second breakable conductive tracks.

6. The security assembly of claim 5, further comprising an intermittent pattern of release ink disposed between the first side of said substrate of said first wrap and said first conductive track to selectively modify a bonding strength between said first conductive track and said substrate of said first wrap.

7. The security assembly of claim 4, wherein:

said first wrap is fitted to the device and covers a first area of the device; and said second wrap is fitted to the device and covers a second area of the device.

* * * * *